(12) United States Patent
Kraemer et al.

(10) Patent No.: US 11,453,177 B2
(45) Date of Patent: Sep. 27, 2022

(54) WELDING ASSEMBLY AND METHOD FOR PRODUCING A WELDING ASSEMBLY

(71) Applicant: JENOPTIK Automatisierungstechnik GmbH, Jena (DE)

(72) Inventors: Wilfried Kraemer, Jena (DE); Andreas Buechel, Kahla (DE)

(73) Assignee: JENOPTIK Automatisierngstechnik GmbH, Jena (DE)

( * ) Notice: Subject to any disclaimer, the term of this patent is extended or adjusted under 35 U.S.C. 154(b) by 663 days.

(21) Appl. No.: 15/769,886

(22) PCT Filed: Oct. 14, 2016

(86) PCT No.: PCT/DE2016/100481
§ 371 (c)(1),
(2) Date: Jun. 22, 2018

(87) PCT Pub. No.: WO2017/067538
PCT Pub. Date: Apr. 27, 2017

(65) Prior Publication Data
US 2018/0311903 A1    Nov. 1, 2018

(30) Foreign Application Priority Data

Oct. 22, 2015  (DE) .......................... 102015118035.9

(51) Int. Cl.
*B29C 65/16*  (2006.01)
*B29C 65/00*  (2006.01)
*B29C 65/82*  (2006.01)

(52) U.S. Cl.
CPC ........ *B29C 65/168* (2013.01); *B29C 65/1635* (2013.01); *B29C 65/8215* (2013.01);
(Continued)

(58) Field of Classification Search
USPC ....................................... 156/272.8
See application file for complete search history.

(56) References Cited

U.S. PATENT DOCUMENTS

| 5,044,852 A | * | 9/1991 | Sweeney ............... | F16B 13/143 248/205.3 |
| 5,904,868 A | * | 5/1999 | Economikos ........ | B23K 1/0056 219/121.63 |

(Continued)

FOREIGN PATENT DOCUMENTS

| CN | 102824687 A | 12/2012 |
| CN | 102917861 A | 2/2013 |

(Continued)

OTHER PUBLICATIONS

First Chinese Office Action with English translation, dated Nov. 1, 2019.

*Primary Examiner* — Vishal I Patel
(74) *Attorney, Agent, or Firm* — Duane Morris LLP

(57) ABSTRACT

A welding assembly having a support part, of a material that is absorbent to a laser radiation, and an attachment part, with at least one collar piece that is transparent to the laser radiation. The support part and the at least one collar piece have a first joining area and a second joining area, which together form a joining region. The surface contours of the joining areas deviate from one another, and so, when the welding assembly is being joined together, the collar pieces are deformed while they come to bear closely against the support part. The attachment part is formed in such a way that it can be taken up by a receiving mandrel and positioned with respect to the support part and pressed against it by means of the receiving mandrel.

9 Claims, 8 Drawing Sheets

(52) U.S. Cl.
CPC ......... *B29C 66/112* (2013.01); *B29C 66/131* (2013.01); *B29C 66/474* (2013.01); *B29C 66/5324* (2013.01); *B29C 66/61* (2013.01); *B29C 66/8322* (2013.01)

(56) References Cited

U.S. PATENT DOCUMENTS

| | | | |
|---|---|---|---|
| 7,815,354 | B2 | 10/2010 | Yamazaki et al. |
| 9,555,580 | B1 * | 1/2017 | Dykstra ................. B23K 35/02 |
| 2002/0092601 | A1 * | 7/2002 | Sweeney, Jr. ............ B60J 1/005 |
| | | | 156/108 |
| 2004/0135988 | A1 | 7/2004 | Link |
| 2004/0200569 | A1 | 10/2004 | Weiblen et al. |
| 2008/0205880 | A1 | 8/2008 | Aoshima et al. |
| 2009/0056865 | A1 | 3/2009 | Kubota et al. |

FOREIGN PATENT DOCUMENTS

| | | |
|---|---|---|
| DE | 199 11 890 A1 | 10/2000 |
| EP | 2 894 023 A1 | 7/2015 |
| JP | 2002-225140 A | 8/2002 |
| JP | 2006256325 A | 9/2006 |
| JP | 2007-030282 A | 2/2007 |

* cited by examiner

WELDING ASSEMBLY AND METHOD FOR PRODUCING A WELDING ASSEMBLY

RELATED APPLICATIONS

The present application is a U.S. National Stage application of International PCT Application No. PCT/DE2016/100481 filed on Oct. 14, 2016 which claims priority benefit of German Application No. DE 10 2015 118 035.9 filed on Oct. 22, 2015, the contents of each are incorporated by reference in their entirety.

FIELD OF THE INVENTION

The present invention relates generally to a welding assembly and to a method for producing a welding assembly having a support part, made of a laser radiation-absorbent material and having at least one first joining surface, and an attachment part, having a longitudinal axis and at least one collar piece consisting of a laser radiation-transparent material, which comprises a second joining surface having a fixed end and a free end and is arranged on a peripheral surface of the attachment part parallel to a longitudinal axis.

BACKGROUND OF THE INVENTION

A welding assembly having a laser-absorbing support part and a laser-transparent attachment part, on the peripheral surface of which a welding collar is formed by which the attachment part was joined to the support part by means of laser transmission welding is known from JP 2007 030 282 A.

Welding assemblies generally produced by means of laser transmission welding and methods for welding such assemblies are widely known in the prior art. So that the parts being welded have surface contact to each other to conduct heat from the absorbing support part to the transmitting attachment part, it is also known from the prior art that the joining surfaces of the two welding partners must be joined together under pressure in a joining region by means of which the welding joint is to be fabricated. Since the laser radiation has to be applied to the joining region on the side of the transmitting attachment part, the pressing force cannot be introduced directly into the joining region if the joining region would block the laser radiation.

DE 199 11 890 A1 describes a sleeve-shaped sensor holder having a partially or completely circumferential collar piece (referred to in DE 199 11 890 A1 as a connecting element), wherein the collar piece is arranged on one of the ends of the sensor holder. The collar piece consists of laser-transparent plastic material, so that the sensor holder is welded onto a support part by means of laser transmission welding in a joining region, not described in more detail, on the collar piece. During laser welding, the sensor holder is fixed in position with respect to the support part by means of a clamping device, wherein the position is fixed without applying pressure in the joining region. The document does not disclose how the surface contact in the joining region required for the conduction of heat from the support part to the sensor holder is achieved.

JP 2007 030 282 A describes a welding assembly consisting of a first laser-transparent component and a second laser-absorbing component, which are welded together by joining surfaces by means of a laser. The first component comprises a conically tapering flexible collar (referred to in JP 2007 030 282 A as a lip) formed on the outer periphery, which, when pressed against the second component, rests against a peripheral boundary wall as the cone angle is being reduced. As a result of the contact of the collar on the boundary wall, the first component is positioned relative to the second component in a defined manner and is positionally secured horizontally, thus preventing horizontal, positional displacements of the joining surfaces relative to one another during the subsequent welding. The required contact with both the boundary wall and a joining surface of the second component results in oversizing. Secured contact with the boundary wall can thus lead to a compression of the collar; more specifically, a cone angle greater than zero is maintained. As a result of these two factors, the two joining surfaces at the least do not have continuous surface contact with one another, which negatively affects the quality of the welded connection.

DESCRIPTION OF THE INVENTION

An object of the invention is to provide a welding assembly with a support part and an attachment part, the welded connection of which has a consistent quality.

Another object of the invention is also to provide a method for producing such a welding assembly.

These objects are achieved by providing a welding assembly having a support part, made of a laser radiation-absorbent material and having at least one first joining surface, and an attachment part, having a longitudinal axis and at least one collar piece consisting of a laser radiation-transparent material, which comprises a second joining surface having a fixed end and a free end and is arranged on a peripheral surface of the attachment part parallel to a longitudinal axis. The at least one first joining surface and the at least one second joining surface form a joining region, by which the attachment part is welded to the support part, forming a welded joint. The attachment part includes at least one pressing surface, by means of which a pressing force acting on the joining region is introduced during the production of the welding assembly. The at least one collar piece is elastic or otherwise flexible. Prior to joining, the second joining surface exhibits a surface contour with respect to an imaginary reference point located on the longitudinal axis and within the first joining surface, which, with respect to the same reference point, has a deviation from the surface contour of the first joining surface that increases or decreases constantly from the fixed end to the free end. It is an essential feature of the invention that a receiving mandrel can be placed on or inserted into the attachment part in the direction of the longitudinal axis in order to receive the attachment part, move it toward the support part, position it on the support part and press it onto said support part by the at least one pressing surface. The at least one pressing surface is preferably configured in such a way that it forms a force-fitting connection acting in the direction of the longitudinal axis with a contact surface on the receiving mandrel. The pulling forces that are active when the force-fitting connection is released load the welded connection; the quality of the welded connection can thus be determined for each individual welding assembly by non-destructive removal of the receiving mandrel from the attachment part.

In order to produce an adequate pulling force for this purpose, the receiving mandrel with the attachment part is paired with a correspondingly high force-fitting connection. The at least one contact surface can be a conical surface on the inside or outside of the attachment part, for example, with a corresponding contact surface on the receiving mandrel.

Depending on the surface contour of the first joining surface on the support part, the surface contour of the second joining surface on the attachment part can advantageously be designed to be different.

The at least one collar piece deviating from a plane through the imaginary reference point and with the free end facing the support part can be preformed, wherein the surface contour of the first joining surface is flat or, at each point, with respect to the imaginary reference point, has a smaller deviation with the same orientation from the plane imagined by the reference point than the deviation from the plane exhibited by the second joining surface at the same point, and the at least one pressing surface is an inner pressing surface, which is arranged between the longitudinal axis and the second joining surface.

The at least one collar piece deviating from a plane through the imaginary reference point and with the free end facing the support part can furthermore be preformed, wherein, at each point, with respect to the imaginary reference point, the surface contour of the first joining surface has a deviation from the plane imagined by the reference point with an opposite orientation to that of a deviation of the second joining surface from the plane at the same point, and the at least one pressing surface is an inner pressing surface, which is arranged between the longitudinal axis and the second joining surface.

The at least one collar piece deviating from a plane through the imaginary reference point and with the free end facing away from the support part can also be preformed, wherein the surface contour of the first joining surface is flat or, at each point, with respect to the imaginary reference point, has a deviation from the plane imagined by the reference point with an opposite orientation to that of a deviation of the second joining surface from the plane at the same point, and the at least one pressing surface is an outer pressing surface which, with respect to the longitudinal axis, is arranged outside the second joining surface.

Or the at least one collar piece deviating from a plane through the imaginary reference point and with the free end facing away from the support part can be preformed, wherein, at each point, with respect to the imaginary reference point, the surface contour of the first joining surface has a smaller deviation from the plane imagined by the reference point with the same orientation as that of a deviation from the plane exhibited by the second joining surface at the same point, and the at least one pressing surface is an inner pressing surface which, with respect to the longitudinal axis, is arranged within the second joining surface.

Independent of the surface contours of the first and second joining surfaces, there is advantageously exactly one collar piece and the second joining surface represents a lateral surface of a truncated cone and the longitudinal axis represents an axis of symmetry.

Alternatively, the second joining surface advantageously represents a lateral surface of a spherical segment and the longitudinal axis represents an axis of symmetry.

It can also be advantageous if there are exactly two collar pieces, the second joining surfaces of which represent symmetrically arranged segments of a lateral surface of a truncated cone or of a spherical segment, and the longitudinal axis is an axis of symmetry.

The assembly of the welding assembly is simplified if there is a recess or an aperture in the support part and the attachment part is at least partially inserted into the support part.

The object of providing a method for producing a welding assembly, is achieved wherein a support part, consisting of a laser radiation-absorbent material and having at least one first joining surface, and an attachment part, having a longitudinal axis and at least one collar piece consisting of a flexible laser radiation-transparent material, which comprises a second joining surface having a fixed end and a free end and is arranged on a peripheral surface of the attachment part parallel to a longitudinal axis, wherein the at least one first joining surface and the at least one second joining surface form a joining region, by which the attachment part is welded to the support part forming a welded joint, while a pressing force acts on the joining region.

In a first method step, the attachment part is made available. In this attachment part, the at least one collar piece consists of a flexible material and the second joining surface has a surface contour, which, from the fixed end to the free end, deviates constantly from the surface contour of the first joining surface. The attachment part is additionally designed in such a way that a receiving mandrel can be placed on or inserted into the attachment part in the direction of its longitudinal axis. The attachment part can be received by means of the attached or inserted receiving mandrel, moved toward the support part, positioned with respect to said support part and pushed onto it.

In a second method step, a receiving mandrel is inserted into or placed on the attachment part and the attachment part is positioned with respect to the support part by means of the receiving mandrel in such a way, that the at least one first and the at least one second joining surface are across from one another, before the attachment part is moved toward the support part until it is in initial contact with the support part.

The pressing surface on the attachment part is advantageously designed in such a way that it forms a force-fitting connection in the direction of the longitudinal axis with a contact surface on the receiving mandrel when the receiving mandrel is inserted or attached.

The pressing force is subsequently introduced into the attachment part in the direction of the longitudinal axis by the receiving mandrel, wherein the attachment part is attached to the support part and the second joining surface continuously snugs up to the first joining surface from the location of initial contact until the first and the second joining surface have complete surface contact. In doing so, the at least one collar piece is elastically deformed in a targeted manner, so that stresses are introduced into the at least one collar piece.

The welding assembly is subsequently subjected to laser radiation by the second joining surface, as a result of which the attachment part and the support part are welded together in the joining region, forming a welded joint, and the introduced stresses in the at least one collar piece are released.

Lastly, the receiving mandrel is pulled out of or off the attachment part.

A pulling force is preferably exerted on the welded connection when the receiving mandrel is pulled out of or off the attachment part, to check the quality of the welded connection.

The surface contour of the second joining surface can be produced in such a way that the deviation from the surface contour of the first joining surface decreases constantly. The pressing force is then introduced between the fixed end and, including, the longitudinal axis by an inner pressing surface.

The surface contour of the second joining surface can alternatively be produced in such a way that the deviation from the surface contour of the first joining surface increases constantly. The pressing force is then introduced, with respect to the longitudinal axis, outside the second joining surface by an outer pressing surface.

The invention will be explained in more detail in the following with the aid of exemplary embodiments and drawings.

DETAILED DESCRIPTION OF THE DRAWINGS

Figure 1:
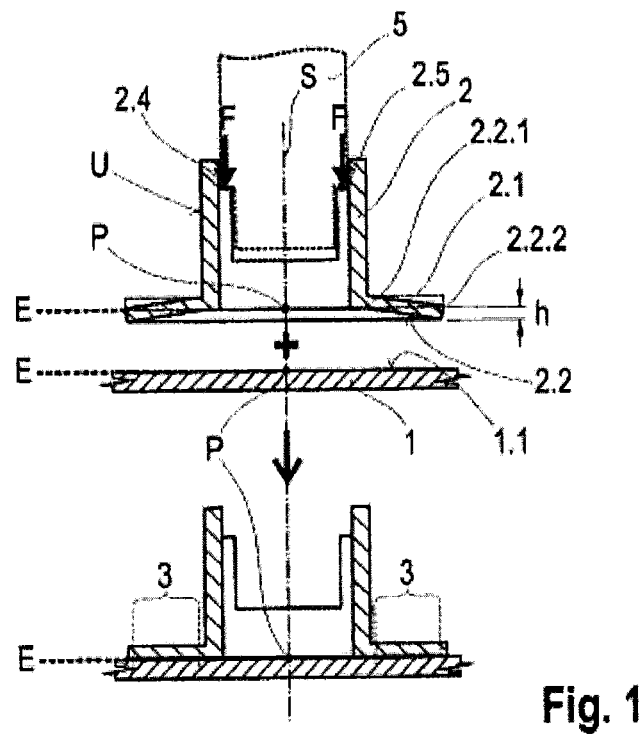
FIG. 1 illustrates a first exemplary embodiment of a welding assembly, in which the support part is a flat first joining surface and the attachment part is a second joining surface, which is preformed deviating from a plane with the free end facing the support part.

Since the differently configured surface contours of the first and second joining surfaces 1.1, 2.2 forming one respective joining region can no longer be seen on the finished welding assembly, in addition to a completely welded welding assembly, the drawings in FIGS. 1 to 8 show the support part 1 and the attachment part 2 positioned with respect to one another prior to welding but not yet in contact, so that the collar pieces 2.1, which in all embodiments of the welding assembly are deformed during joining and thus placed under tension, are in a relaxed state. The cross section of the collar pieces 2.1, and thus also the shape of the second joining surfaces 2.2, is not described in any more detail here.

Examples of this are shown in FIGS. 11a-f and 12a-e.

In FIGS. 1, 2, 3 and 4, one respective design of a receiving mandrel is indicated by a dashed line. The designs of the receiving mandrel are not bound to the respective illustrated designs of the collar pieces, but can also be combined with other respective designs of the collar pieces.

A welding assembly according to the invention, as is shown in all of FIGS. 1 to 8, always includes a support part 1 and an attachment part 2. The support part 1 is produced from a laser radiation-absorbing material suitable for laser transmission welding and has at least one first joining surface 1.1. The attachment part 2 has a longitudinal axis S and at least one collar piece 2.1 consisting of a laser radiation-transparent material and having a second joining surface 2.2, which is formed orthogonally to the longitudinal axis S on a peripheral surface U of the attachment part 2 parallel to the longitudinal axis S.

For the sake of simplicity in the description of the invention, it will be assumed that the attachment part 2 has a circular cross section, so that the longitudinal axis S represents an axis of symmetry and the peripheral surface U represents a cylinder mantle. The at least one collar piece 2.1 has a free end 2.2.2 and a fixed end 2.2.1 connected to the peripheral surface U of the attachment part 2. However, in principle, the attachment part 2 need not have a circular cross section but can have any desired, even freely shaped, cross section. The peripheral surface U parallel to the longitudinal axis S also does not have to extend along the entire height of the attachment part 2 or the entire circumference of the attachment part 2.

If the attachment part 2 has only one collar piece 2.1, it is then advantageously a collar piece 2.1 that encloses the attachment part 2 completely.

A plurality of collar pieces 2.1 are advantageously arranged uniformly on the peripheral surface U at the same height relative to the longitudinal axis S. They can, however, also be arranged at different heights. For the sake of simplicity, only one collar piece 2.1 is assumed and illustrated in the following exemplary embodiments, wherein the statements made about this one collar piece are true for the plurality of collar pieces 2.1 as applicable.

In the case of an axially symmetric attachment part 2 (see FIG. 13b) or a rotationally symmetric attachment part 2 (see FIG. 13a), the longitudinal axis S represents an axis of symmetry.

In each case one of the first joining surfaces 1.1 and one of the second joining surfaces 2.2 together form a joining region 3, by which the attachment part 2 is welded to the support part 1.

It is essential that the at least one collar piece 2.1 is flexible and that, prior to joining, the second joining surface 2.2 exhibits a surface contour with respect to an imaginary reference point P located on the longitudinal axis S and within the first joining surface 1.1, which, at each point, deviates from a surface contour of the first joining surface 1.1 with respect to the same reference point P. The deviation decreases or increases constantly from the fixed end 2.2.1 of the second joining surface 2.2 to its free end 2.2.2.

Figure 2:
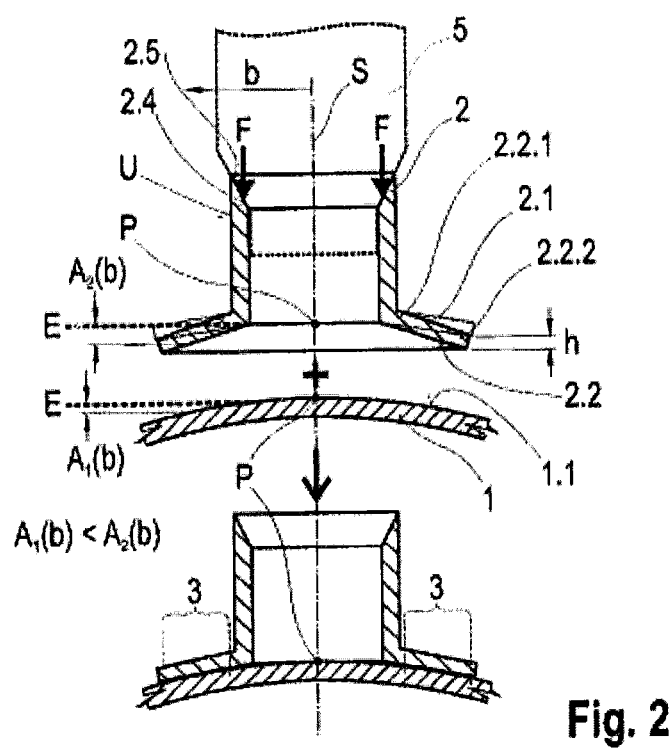
FIG. 2 illustrates a second exemplary embodiment of a welding assembly, in which the support part is a convex first joining surface and the attachment part comprises a second joining surface, which is preformed deviating from a plane with the free end facing the support part.
Figure 3:
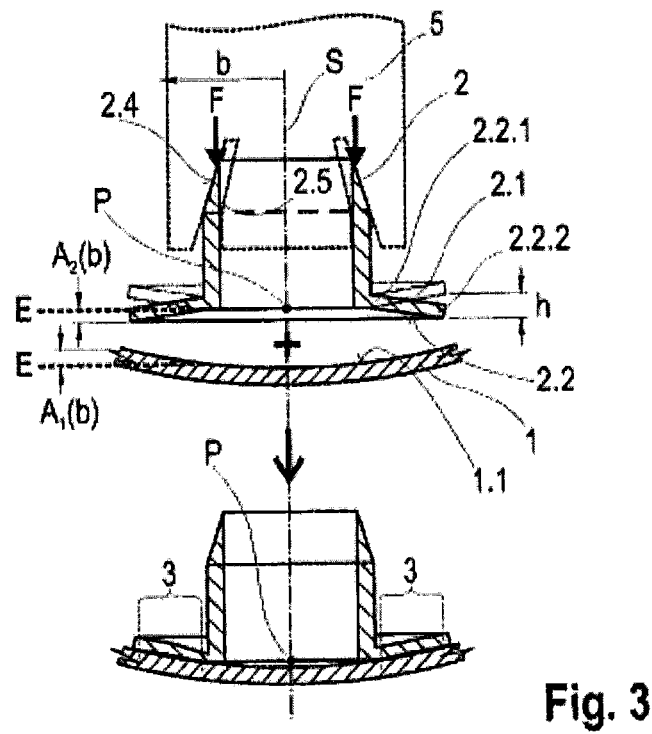
FIG. 3 illustrates a third exemplary embodiment of a welding assembly, in which the support part is a concave first joining surface and the attachment part comprises a second joining surface, which is preformed deviating from a plane with the free end facing the support part.

FIGS. 1, 2 and 3 show three exemplary embodiments for welding assemblies, in which the collar piece 2.1 deviating from a plane E through the imaginary reference point P and with the free end 2.2.2 facing the support part 1 is preformed.

The surface contour of the first joining surface 1.1 is flat according to the first exemplary embodiment (FIG. 1), convex according to the second exemplary embodiment (FIG. 2) and concave according to the third exemplary embodiment (FIG. 3).

The collar piece 2.1 according to the second exemplary embodiment (FIG. 2) is dimensioned in such a way that, at each point, with respect to the imaginary reference point P, the first joining surface 1.1 has a smaller deviation $A_1$ with the same orientation from the plane E imagined by the reference point P than the deviation $A_2$ from the plane E exhibited by the second joining surface 2.2 at the same point. As the distance b from the imaginary reference point P increases, the deviation of the surface contours from one another decreases constantly from the fixed end 2.2.1 of the second joining surface 2.2 to its free end 2.2.2. This is also the case for the first and third exemplary embodiments.

Figure 10:
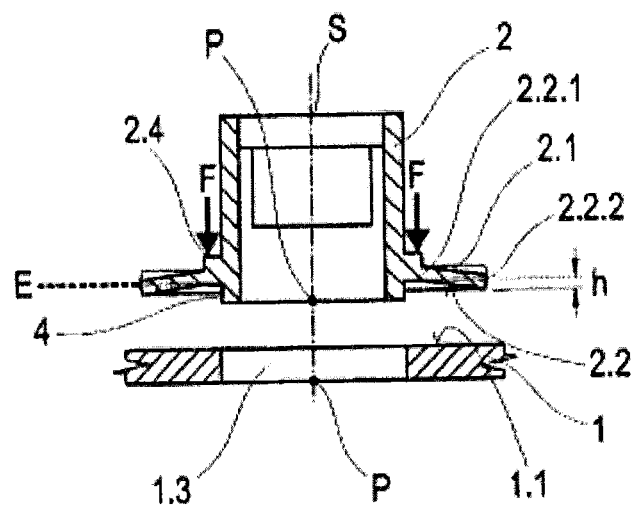
FIG. 10 illustrates a second modification of the attachment part for all the illustrated exemplary embodiments of welding assemblies.

The attachment parts 2 of the three exemplary embodiments respectively include an inner pressing surface 2.4, i.e. a pressing surface located between the fixed end 2.2.1 and the longitudinal axis S. In the case of attachment parts 2 which are welded to a support part 1 in such a way that the longitudinal axis S of said attachment part coincides with a line perpendicular to the first joint surface 1.1 of the support part 1, the inner pressing surface 2.4 is located in a plane perpendicular to the longitudinal axis S for optimal transmission of the pressing force F, as schematically shown in FIG. 1. A receiving mandrel 5, which is indicated by dashed lines and inserted into the attachment part 2, rests against said inner pressing surface 2.4 with a contact surface 2.5. In other designs, which are not explained in greater detail here, the welding assembly can also be configured in such a way that the longitudinal axis S forms an acute angle with a line perpendicular to the first joining surface 1.1 of the support part 1. For optimum force transmission, the inner pressing surface 2.4 then forms a corresponding complementary angle with the longitudinal axis S. The inner pressing surface 2.4 is shown here in FIG. 1 within the peripheral surface U of the attachment part 2, but can also be formed on the collar piece 2.1 outside the peripheral surface U of the attachment part 2 and adjoining the fixed end 2.2.1 of the second joining surface 2.2, as shown in FIG. 10.

According to FIGS. 2 and 3, the inner pressing surfaces 2.4 are conical surfaces arranged around the longitudinal axis S, which delimit an inner peripheral surface on the one hand and the outer peripheral surface U of the attachment part 2 on the other hand. Corresponding contact surfaces 2.5 are formed on the inserted or attached receiving mandrel 5, which is indicated in each case with dashed lines. A stronger or weaker force fit is created by a more or less deep insertion or placement of the contact surfaces 2.5 onto said inner pressing surfaces 2.4, the release of which requires a corresponding higher or lower pulling force. In order to comply with a demanded quality, the welded connection has to withstand a predefined pulling force. In accordance with this predefined pulling force, the receiving mandrel 5 and the attachment part 2 are dimensioned in such a way that a force-fitting connection can be produced between them, the release of which requires the predefined pulling force.

Figure 4:
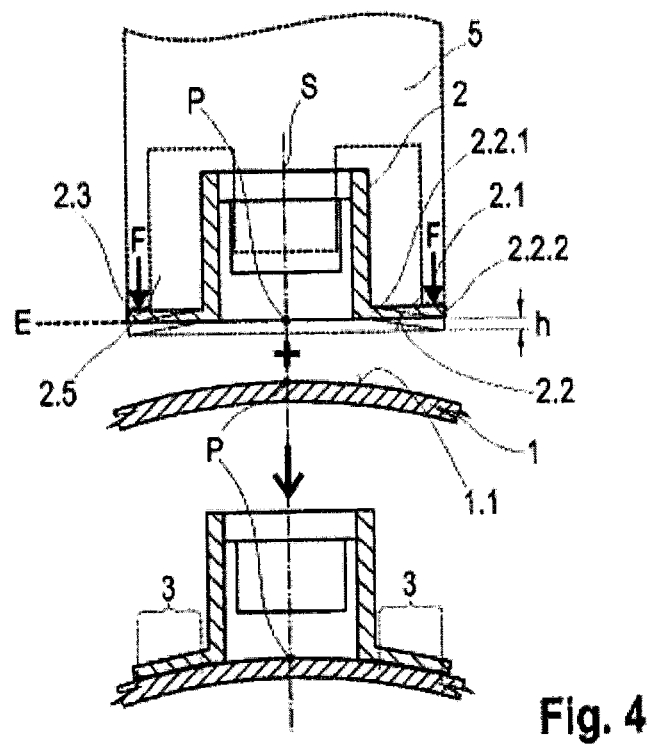
FIG. 4 illustrates a fourth exemplary embodiment of a welding assembly, in which the support part is a convex first joining surface and the attachment part comprises a second joining surface, which constitutes a plane surface.
Figure 5:
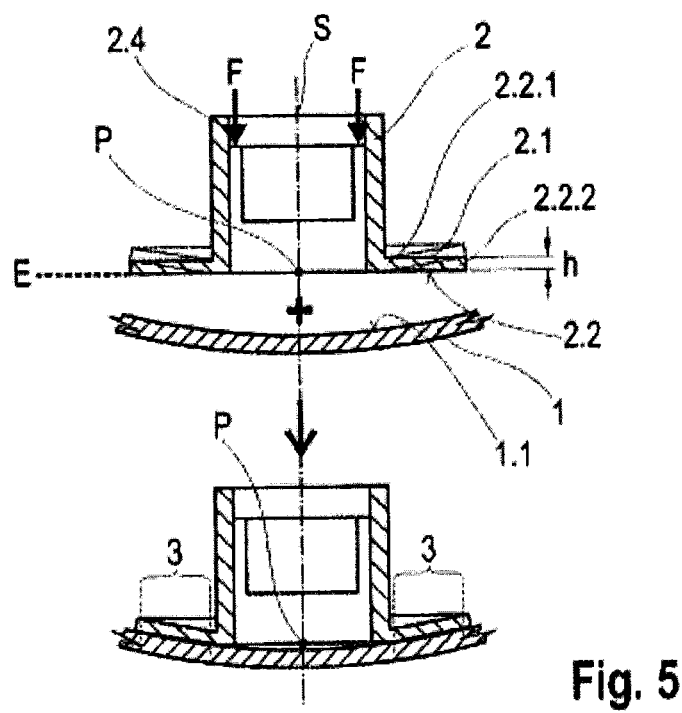
FIG. 5 illustrates a fifth exemplary embodiment of a welding assembly, in which the support part is a concave first joining surface and the attachment part comprises a second joining surface, which constitutes a plane surface.

A fourth and fifth exemplary embodiment are shown in FIGS. 4 and 5, respectively.

Here, the collar piece 2.1 has a flat second joining surface 2.2, and is respectively welded to a support part 1 having a convex or a concave shape.

A design according to the fourth exemplary embodiment (FIG. 4) may suffice in comparison to the second exemplary embodiment (FIG. 2), if the first joining surface 1.1 is comparatively more curved, so that an adequately long delivery path h is made possible even with a flat second joining surface 2.2, or if an inner pressing surface 2.4 cannot be installed on the attachment part 2. A pressing force F has to be introduced by an outer pressing surface 2.3 in this design, because, in contrast to the aforementioned exemplary embodiments in which, when the attachment part 2 is joined to the support part 1, the initial contact of the second joining surface 2.2 with the first joining surface 1.1 occurs at the free end 2.2.2, here the initial contact occurs at the fixed end 2.2.1. This means that, in this case, the second joining surface 2.2 is nestled up to the first joining surface 1.1 proceeding from the fixed end 2.2.1 toward the free end 2.2.2. An outer contact surface 2.3 can always only be located outside the second joining surface 2.2 with respect to the longitudinal axis S, so that the collar piece 2.1 here is designed to be larger by an outer contact surface 2.3. A further design of the receiving mandrel 5 is shown with the aid of the fourth exemplary embodiment, shown in FIG. 4. As is the case in FIG. 1, the manner in which the receiving mandrel 5 is connected to the attachment part 2 is not shown. Form-fitting connections, e.g. by means of a latching mechanism or a clamping device, are conceivable options. In this case, the contact surface 2.5 is located across from the outer contact surface 2.3.

As in the first three exemplary embodiments, the pressing force F in a design according to the fifth exemplary embodiment (FIG. 5) has to again be introduced by an inner pressing surface 2.4, because here too the initial contact occurs at the free end 2.2.2. This means that the second joining surface 2.2 is nestled up to the first joining surface 1.1 proceeding from the free end 2.2.2 toward the fixed end 2.2.1.

Figure 6:
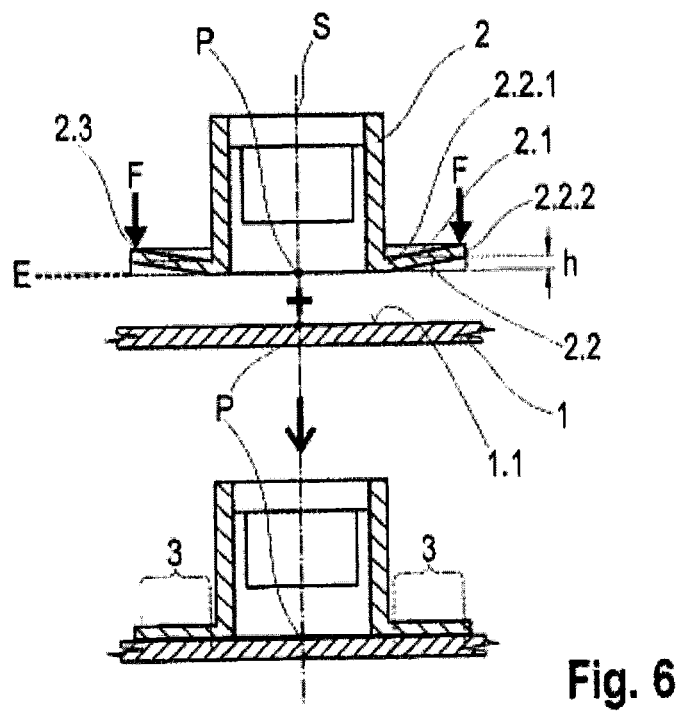
FIG. 6 illustrates a sixth exemplary embodiment of a welding assembly, in which the support part is a flat first joining surface and the attachment part comprises a second joining surface, which is preformed deviating from a plane with the free end facing away from the support part.
Figure 7:
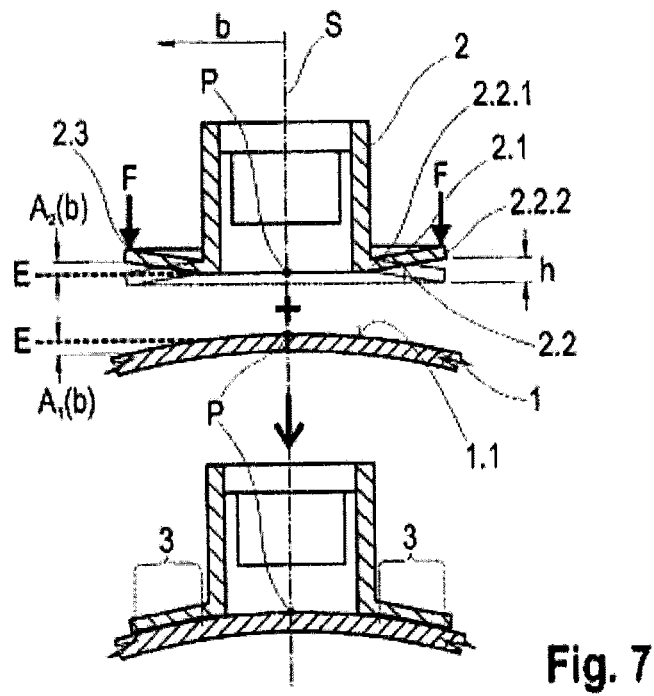
FIG. 7 illustrates a seventh exemplary embodiment of a welding assembly, in which the support part is a convex first joining surface and the attachment part comprises a second joining surface, which is preformed deviating from a plane with the free end facing away from the support part.
Figure 8:
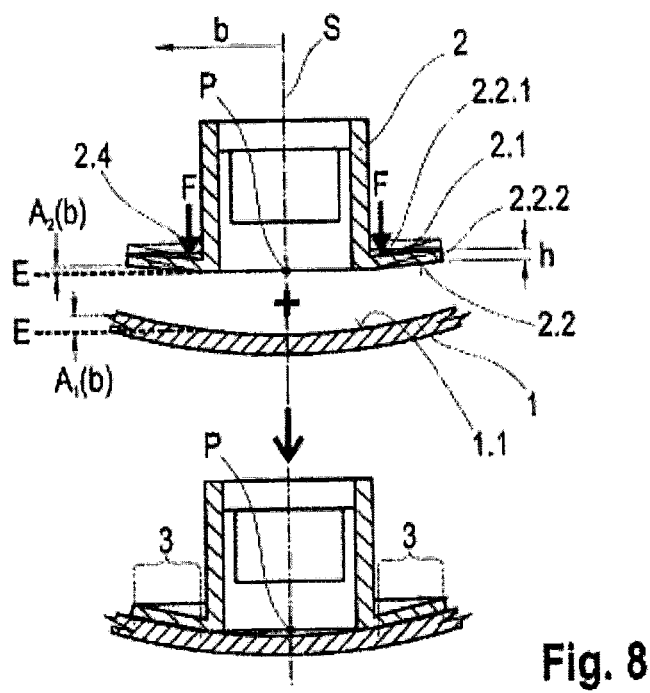
FIG. 8 illustrates an eighth exemplary embodiment of a welding assembly, in which the support part is a concave first joining surface and the attachment part comprises a second joining surface, which is preformed deviating from a plane with the free end facing away from the support part.
Figure 9:
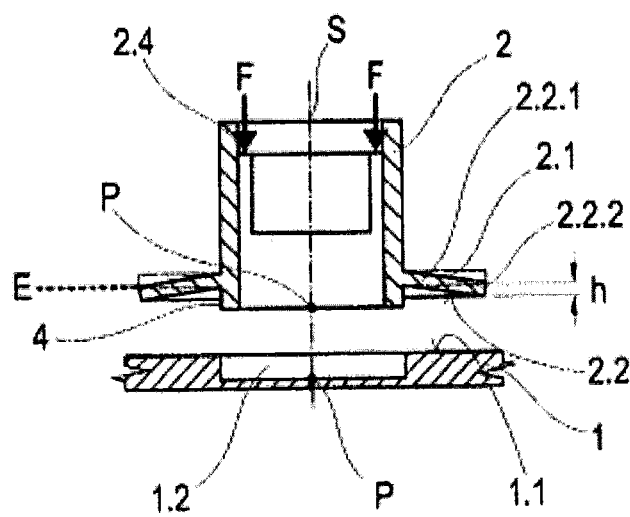
FIG. 9 illustrates a first modification of the attachment part for all the illustrated exemplary embodiments of welding assemblies.

Three exemplary embodiments of welding assemblies, in which the collar piece 2.1 deviating from a plane E through the imaginary reference point P and with the free end 2.2.2 facing away from the support part 1 is preformed, are shown in FIGS. 6, 7 and 8.

The surface contour of the first joining surface 1.1 is flat according to the sixth exemplary embodiment (FIG. 6), convex according to the seventh exemplary embodiment (FIG. 7) and concave according to the eighth exemplary embodiment (FIG. 8).

The attachment parts 2 according to the sixth and seventh exemplary embodiments respectively have an outer pressing surface 2.3 and, with a corresponding strong curvature of the first joining surface 1.1, the attachment part 2 according to the eighth exemplary embodiment has an inner pressing surface 2.4.

According to FIG. 8, the collar piece 2.1 experiences a deformation during joining that is a function of the shape deviation between the first and the second joining surface 1.1, 2.2, and the free end 2.2.2 of the collar piece 2.1 is deflected by a delivery path h which is dependent on said deformation.

Assuming that the surface shape of the support part 1 and the location at which the attachment part 2 is to be welded on are predefined, it is possible, with the principles according to the invention, to design the attachment part 2 in such a way that a high-quality welding assembly can be produced without having to adapt one or more joining surfaces provided on the attachment part 2 (second joining surfaces 2.2) for welding to the support part 1 exactly to the surface contour of associated regions of the surface of the support part 1, which then represent the joining surfaces (first joining surfaces 1.1) of said support part. In addition, when producing welding assemblies according to the invention, only comparatively smaller pressing forces F are required, because the second joining surfaces 2.2 snug flexibly up to the first joining surfaces 1.1. The pressing force F has to only be large enough for the collar piece 2.1 to snug up completely at least in the joining region 3.

In order to provide a sufficient amount of pressing force F into the joining region 3 to produce the welded connection, the collar piece 2.1 can comprise different cross-sectional shapes, as shown as an example in FIGS. 11*a-f* and 12*a-e*, regardless of whether it is preformed deviating from a plane E through the imaginary reference point (P) with the free end 2.2.2 facing toward or away from the support part 1 and regardless of how great the deviation is.

Figure 11A:
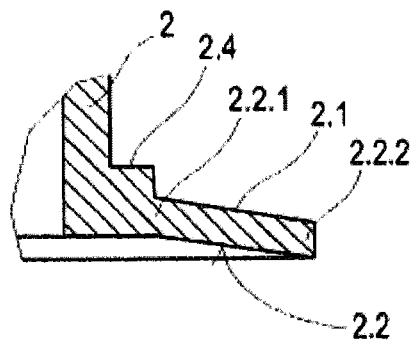
FIG. 11a-f illustrate different examples of configurations of the collar pieces for all exemplary embodiments of welding assemblies having a second joining surface, which is preformed deviating from a plane facing the support part.
Figure 12A:
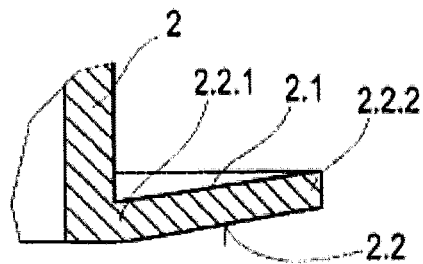
FIG. 12a-e illustrate different examples of configurations of the collar pieces for all exemplary embodiments of welding assemblies having a second joining surface, which is preformed deviating from a plane facing away from the support part.
Figure 13A:
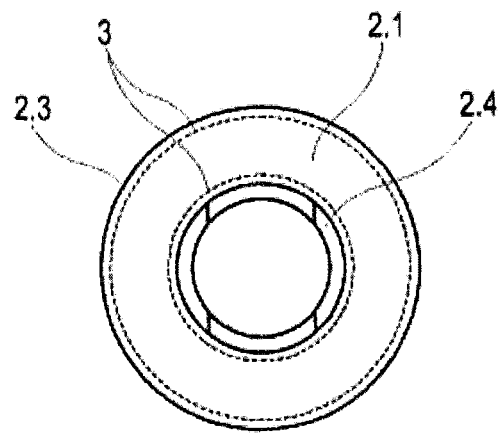
FIG. 13a-b illustrate plan views onto examples of possible outside contours for all exemplary embodiments of welding assemblies.

If the attachment part 2 has only one collar piece 2.1 which, as shown in FIG. 13*a*, advantageously forms a closed ring, the second joining surface 2.2 can represent a lateral surface of a truncated cone, e.g. as in FIGS. 11*a* and 12*a*. The thickness of the collar piece 2.1 is constant.

Figure 11B:
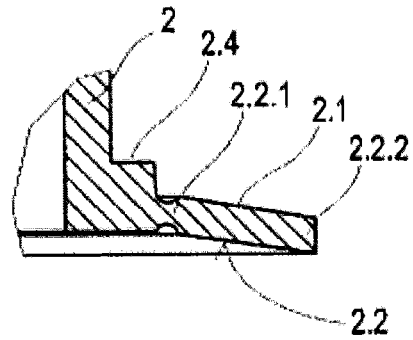
Figure 12B:
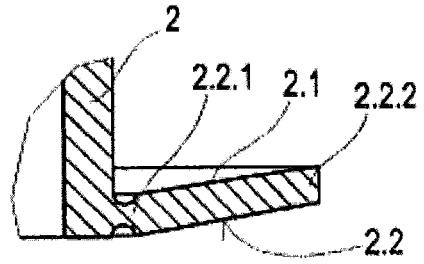

The collar pieces 2.1 according to FIGS. 11*b* and 12*b* differ from those shown in FIGS. 11*a* and 12*a* in that the fixed end 2.2.1 is tapered, as a result of which, depending on the degree of tapering, the formed solid-body joint becomes more pliant.

Figure 11C:
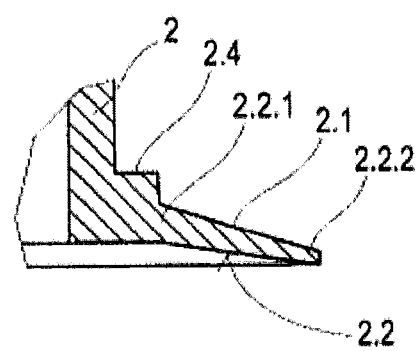
Figure 11D:
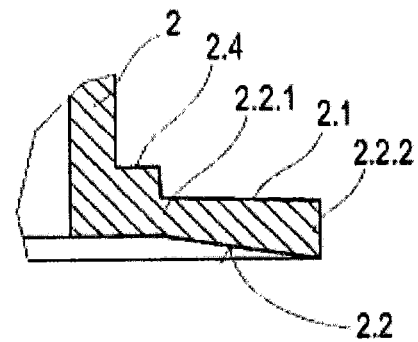
Figure 12C:
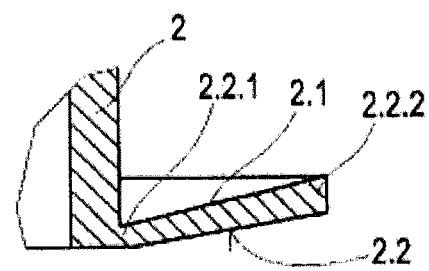

The flexibility of the collar pieces 2.1 over their length between the fixed and the free ends 2.2.1, 2.2.2 can be influenced by decreasing or increasing the thickness toward the free end 2.2.2, as indicated in FIGS. 11*c*, 11*d* and 12*c*.

Figure 11E:
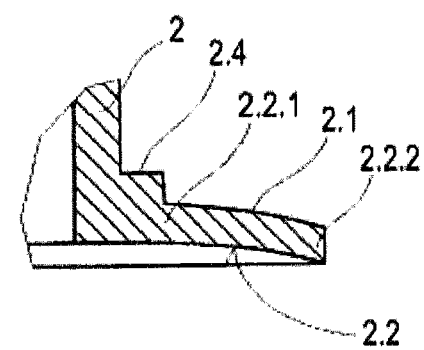
Figure 11F:
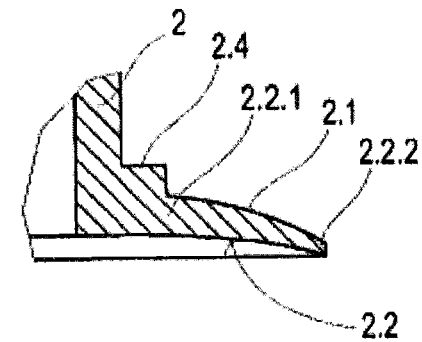
Figure 12D:
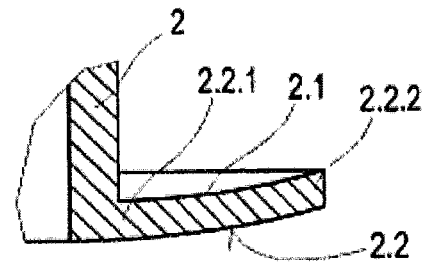
Figure 12E:
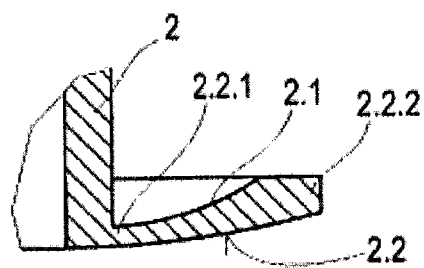

As in FIGS. 11*e* and 12*d*, the second joining surface 2.2 can also be formed by the lateral surface of a spherical segment, the thickness of which can be constant or, as indicated in FIGS. 11*f* and 12*e*, increase or decrease toward the free end 2.2.2.

With all these measures, the flexibility of the collar piece 2.1 can be influenced independent of the material selection.

A welding assembly where attachment part 2 surrounds a joining region 3 is desired, which is especially resilient, is advantageous. Since, in this case, the only one joining region 3 extends over a large surface on the support part 1, the effect is particularly significant compared to the state of the art. The larger the joining surfaces 1.1, 2.2, the more difficult it is, as in the state of the art, to match them precisely to one another in such a way that they can be welded together without gaps.

Figure 13B:
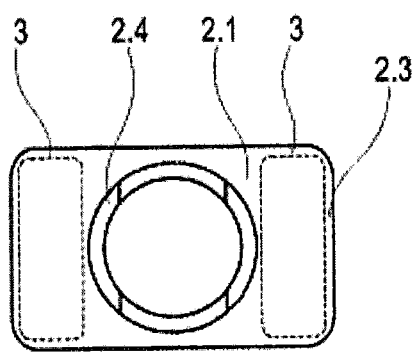

The welding assembly can, however, advantageously also have a plurality of collar pieces 2.1, in particular when there is no space for a collar piece 2.1 that encloses the attachment part 2 completely. As in the state of the art, two collar pieces 2.1 can be arranged symmetrically to the longitudinal axis S, as shown in FIG. 13*b*. The shape of the second joining surfaces 2.2 could in this case also correspond to segments of a cone surface area.

It is alternatively also possible to arrange more than two collar pieces 2.1 around the periphery. If applicable, they are advantageously arranged distributed in a uniform manner.

FIGS. 11*a-f* respectively show an inner pressing surface 2.4. It can be provided additionally or alternatively to an inner pressing surface 2.4 arranged within the peripheral surface U of the attachment part 2, as shown in FIGS. 1 to 8.

Compared to the exemplary embodiments according to FIGS. 1 to 8, FIGS. 9 and 10 show an insertion connector 4 as an additional feature on the attachment part 2, the peripheral shape of which matches the shape of a recess 1.2 (FIG. 9) or an aperture 1.3 (FIG. 10) in the support part 1. Instead of having the insertion connector 4, it is also possible to position the collar piece 2.1 relatively higher on the peripheral surface U, so that the peripheral surface U protrudes out of the collar piece 2.1. The collar piece is inserted into the recess 1.2 or the aperture 1.3 by the insertion connector 4 or the protruding part of the collar piece 2.1. On the one hand, this facilitates the positioning of the attachment part 2 with respect to the support part 1 and, on the other hand, it increases the stability of the welding assembly. This is particularly useful when the flexibility of the collar piece 2.1 is achieved primarily by the choice of material, and not by the dimensioning of the collar piece 2.1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS

1 Support part
1.1 First joining surface
1.2 Recess
1.3 Aperture
2 Attachment part
2.1 Collar piece
2.2 Second joining surface
2.2.1 Fixed end
2.2.2 Free end
2.3 Outer pressing surface
2.4 Inner pressing surface
2.5 Contact surface
3 Joining region
4 Insertion connector
5 Receiving mandrel
S Longitudinal axis
E Plane
P Reference point
U Peripheral surface
$A_1$ Deviation (of the first joining surface 1.1 from the plane E)
$A_2$ Deviation (of the second joining surface 2.2 from the plane E)
F Pressing force
h Delivery path
b Distance

What is claimed is:

1. Welding assembly comprising
a support part made of a laser radiation-absorbent material;
at least one first joining surface located on said support part;
an attachment part, having a longitudinal axis and at least one collar piece formed of a laser radiation-transparent material;

at least one second joining surface located on said at least one collar piece;

said second joining surface having a fixed end and a free end;

said second joining surface being arranged on a peripheral surface of the attachment part parallel to the longitudinal axis, said at least one first joining surface and said at least one second joining surface form a joining region;

said attachment part being laser welded to said support part by a source of laser radiation, thereby forming a welded joint;

said attachment part having at least one pressing surface, said pressing surface being available for receiving a pressing force acting on the joining region during production of the welding assembly;

said at least one collar piece being flexible thereby permitting the second joining surface to exhibit, prior to their being joined, a surface contour with respect to an imaginary reference point located on the longitudinal axis and within the first joining surface, which, with respect to the same reference point, has a deviation from the surface contour of the first joining surface that increases or decreases constantly from the fixed end to the free end; and said attachment part configured for receiving a mandrel which can be placed on or inserted into the attachment part and oriented in the direction of the longitudinal axis so that it can be moved toward and placed the support part by the at least one pressing surface.

2. Welding assembly according to claim 1, wherein said at least one pressing surface is configured in such a way that, with a contact surface on the attached or inserted receiving mandrel, it forms a force-fitting connection acting in the direction of the longitudinal axis.

3. Welding assembly according to claim 1, wherein said at least one collar piece deviating from a plane through the imaginary reference point and with the free end facing the support part is preformed, wherein the surface contour of the first joining surface is flat or, at each point, with respect to the imaginary reference point, has a smaller deviation with the same orientation from the plane imagined by the reference point than the deviation from the plane exhibited by the second joining surface at the same point, and the at least one pressing surface is an inner pressing surface, which is arranged between the longitudinal axis and the second joining surface.

4. Welding assembly according to claim 1, wherein said at least one collar piece deviating from a plane through the imaginary reference point and with the free end facing the support part is preformed, wherein, at each point, with respect to the imaginary reference point, the surface contour of the first joining surface has a deviation from the plane imagined by the reference point with an opposite orientation to that of a deviation of the second joining surface from the plane at the same point, and the at least one pressing surface is an inner pressing surface, which is arranged between the longitudinal axis and the second joining surface.

5. Welding assembly according to claim 3, wherein the inner pressing surface is a conical surface with respect to the longitudinal axis.

6. Welding assembly according to claim 1, wherein the at least one collar piece deviating from a plane through the imaginary reference point and with the free end facing away from the support part is preformed, wherein the surface contour of the first joining surface is flat or, at each point, with respect to the imaginary reference point, has a deviation from the plane imagined by the reference point with an opposite orientation to that of a deviation of the second joining surface from the plane at the same point, and the at least one pressing surface is an outer pressing surface which, with respect to the longitudinal axis, is arranged outside the second joining surface.

7. Welding assembly according to claim 1, wherein the at least one collar piece deviating from a plane through the imaginary reference point and with the free end facing away from the support part is preformed, wherein, at each point, with respect to the imaginary reference point, the surface contour of the first joining surface has a smaller deviation from the plane imagined by the reference point with the same orientation as that of a deviation from the plane exhibited by the second joining surface at the same point, and the at least one pressing surface is an inner pressing surface which, with respect to the longitudinal axis, is arranged within the second joining surface.

8. Welding assembly according to claim 1, wherein there is exactly one collar piece, and the second joining surface represents a lateral surface of a truncated cone or a spherical segment and the longitudinal axis represents an axis of symmetry.

9. Welding assembly according to claim 1, wherein the support part comprises a recess or an aperture and the attachment part is at least partially inserted into the support part.

* * * * *